AUTOMATIC FREQUENCY CONTROL CIRCUIT FOR FREQUENCY SHIFT RADIO TELEGRAPHY
Filed Feb. 29, 1956
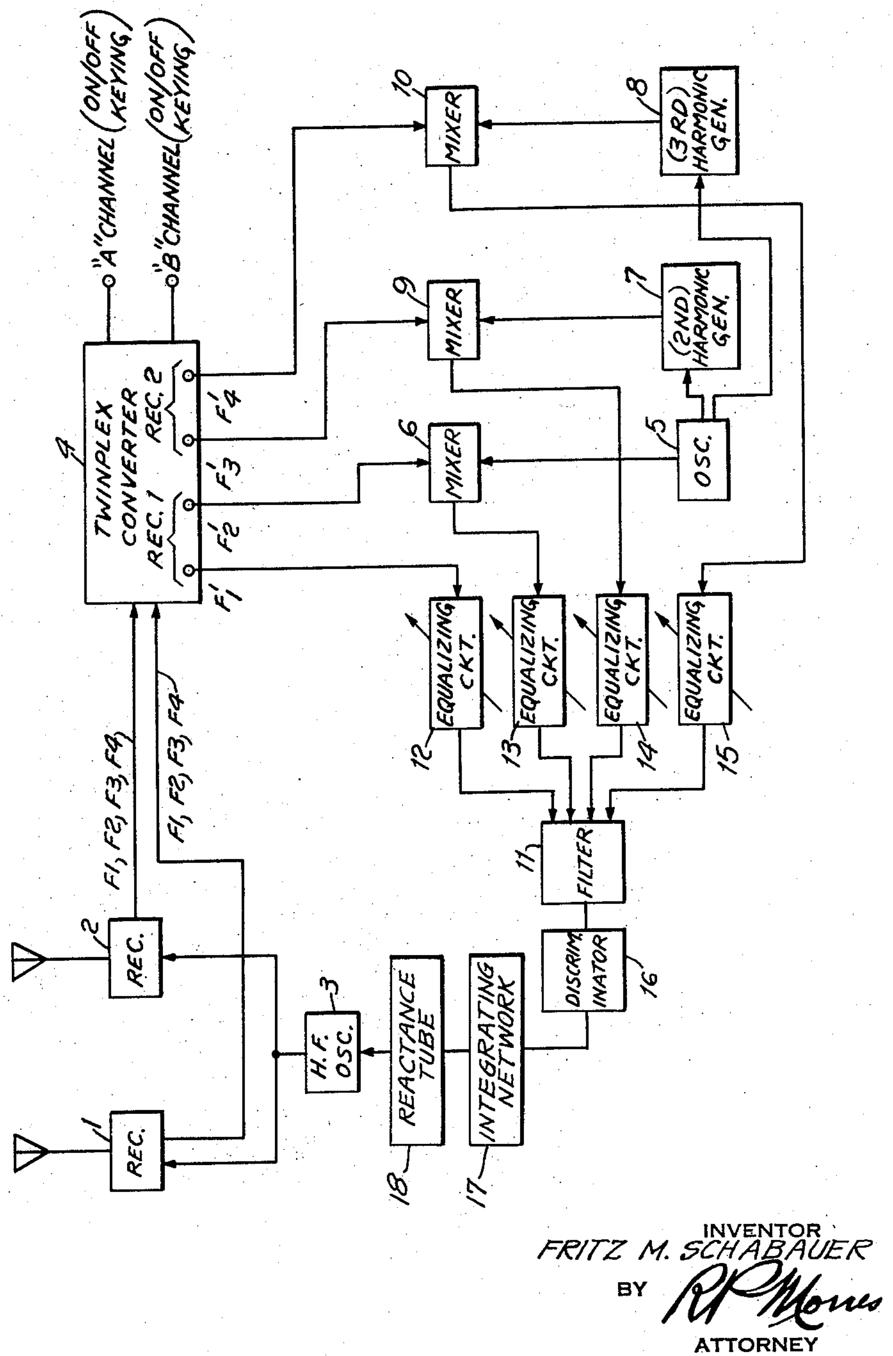
INVENTOR
FRITZ M. SCHABAUER
BY R P Mones
ATTORNEY United States Patent Office 2,855,506
Patented Oct. 7, 1958

2,855,506

AUTOMATIC FREQUENCY CONTROL CIRCUIT FOR FREQUENCY SHIFT RADIO TELEGRAPHY

Fritz M. Schabauer, Bayshore, N. Y., assignor to Mackay Radio and Telegraph Company, New York, N. Y., a corporation of Delaware Application February 29, 1956, Serial No. 568,690

1 Claim. (Cl. 250—8)

This invention relates to an automatic-frequency-control circuit, and particularly to a circuit for use in a communication system requiring a plurality of different carrier frequency signals for the transmission of intelligence.

More specifically, this invention relates to such an automatic-frequency-control circuit which operates continuously, or sufficiently continuously to effect satisfactory control, irrespective of the particular carrier frequency being received.

This invention has utility in a receiver of any plural frequency system wherein it is desired to control continuously the frequency of the associated local high frequency oscillator. One such system is the frequency-shift telegraphy system. An adaptation of the frequency-shift telegraphy system is the communication system known by the trademark, Twinplex, developed by Mackay Radio and Telegraph Company, New York, N. Y. Detailed discussion of the Twinplex Radiotelegraph System is printed in the publication entitled, Electrical Communication, March 1952 issue. Since this invention has particular utility in the Twinplex system, it will be described in conjunction therewith.

It is sufficient for the purpose of understanding this invention to known that Twinplex is a two-channel, radio-telegraphy system in which a signalling condition, mark or space, on each of two channels is derived from a single instantaneous frequency. The twinplex system combines two, 2-element mark-space channels to form on the frequency scale a single four-element channel wherein each of the four frequencies represents one of the four possible mark-space combinations. For example, the mark-mark combination is represented by the detected receiver frequency of 1950 cycles per second (C. P. S.); the mark-space combination is represented by the detected receiver frequency of 2350 C. P. S.; and the space-mark and space-space combinations are represented by the detected receiver frequencies of 2750 and 3150 C. P. S. respectively. Thus, for the communication of intelligence, a plurality of instantaneous carrier frequency signals are required.

Heretofore, no automatic-frequency-control (AFC) circuit was utilized in the Twinplex receiver, and therefore the quality of reception suffered as a result of frequency-drift of the high frequency local oscillator associated with the Twinplex receiver. Such drift was not uncommon because the local oscillator generated a wave having a frequency in the order of 20 megacycles, and as low as a .001% error resulted in a drift of 200 cycles, which is considerable.

Accordingly, it is an object of this invention to provide an AFC circuit in a plural frequency receiver capable of controlling continuously, or sufficiently continuously, the frequency of an associated high frequency local oscillator.

It is a feature of this invention to provide such an AFC circuit, which is operative in response to all, or any given number of carrier frequency signals received at different time intervals.

It is a further feature of this invention to provide a circuit for deriving an average AFC voltage for any frequency-drift which may occur at the transmitter end, or at the associated high frequency oscillator.

In accordance with an aspect of the invention, there is provided a receiving system for receiving any of a plurality of different carrier frequency signals transmitted at different time intervals, including a local oscillator and heterodyning means for converting the carrier frequency signals into a corresponding number of intermediate frequency signals. The invention is characterized by providing an AFC circuit comprising a source or sources of relatively low reference frequency oscillations and means for mixing given ones of the oscillations with given ones of the intermediate frequency signals respectively, to produce a generally common resultant frequency; the resultant frequency being subject to variation as a result of frequency-drift in the local oscillator and/or the radio transmitter. An average control voltage is derived from successive resultant frequencies which voltage is applied to the oscillator, whereby control thereof is effected.

The expression, intermediate frequency, is intended to mean that frequency which results from heterodyning the radio-frequency energy with local oscillations. In practice, the I. F. may be in the audio frequency range. Further, the expression, sufficiently continuously, as applied to AFC is construed to mean that the control is exercised during the reception of at least half the plural number of frequencies, and preferably more than half but less than all of the frequencies.

It is to be realized that any one of the frequency signals may provide automatic-frequency-control but since no one frequency signal appears continuously, it is essential for adequate control that all or almost all of the instantaneous signals (one of which is always available) be employed.

The above-mentioned and other features and objects of this invention and the manner of attaining them will become more apparent and the invention itself will be best understood by reference to the following description of an embodiment of the invention taken in conjunction with the accompanying drawing, which is a block diagram of a typical Twinplex diversity receiver employing the AFC circuit of this invention.

The receiving system comprises receivers 1 and 2 each of which is tuned to receive all of the plural frequency signals. The receivers are of the heterodyne type, whereby the carrier signals are beat with oscillations from a high frequency oscillator 3 to produce intermediate-frequency signals. The intermediate-frequency signals are then beat to an audio level by an intermediate crystal oscillator. The intermediate crystal oscillator is fixed and of such stability that its frequency drift is negligible compared to the high frequency oscillator which is variable in frequency. The signals derived from the receivers 1 and 2 are applied to a Twinplex converter 4. In the converter 4, the four frequencies are amplitude limited and separated into A and B channels. For details of the construction and operation of the converter 4, reference is made to the aforementioned publication.

In accordance with this invention, the frequency of the high-frequency oscillator 3 is controlled by an AFC circuit coupled between the Twinplex converter 4 and the high frequency oscillator 3. As discussed above one of the plurality of signals is present at any instant of time; the particular signal being a function of the intelligence communicated. Therefore, it cannot be predicted in advance which of the plural frequency signals will be present at any particular instant, or for that matter, which of the plural frequency signals will predominate over a period of time. Therefore, in order to effectuate satisfactory control on the oscillator 3 it is necessary to derive a control signal from any of the frequency signals which might be present, and preferably to derive an average AFC voltage from successive signals. Accordingly, assuming that the Twinplex system under consideration utilizes four different frequency signals then in order to have completely continuous control, the four frequency signals, mark-mark, mark-space, space-mark and space-space signals must be utilized to provide the control voltage. The four signals denoted as $F_1$, $F_2$, $F_3$ and $F_4$ in the drawing, are coupled into the AFC circuit. For simplicity and economy of design, it is desirable to convert the signals $F_1$, $F_2$, $F_3$ and $F_4$ to a generally common frequency level, and utilize only the common frequency to produce the control voltage rather than, to employ separate AFC circuits for each of the intermediate frequencies $F'_1$, $F'_2$, $F'_3$ and $F'_4$. To further simplify the design of the AFC circuit, frequency $F'_1$ is chosen as the generally common level and frequencies $F'_2$, $F'_3$ and $F'_4$ are converted to the frequency $F'_1$. For this purpose a reference source of oscillation 5 is provided which is applied to mixer 6 together with frequency $F'_2$, whereby a beat frequency of $F'_1$ is obtained at the output thereof. Coupled to the output of reference oscillator 5 are harmonic generators 7 and 8 which produce signals of suitable frequencies, and the respective outputs thereof are coupled to mixers 9 and 10 together with frequencies $F'_3$ and $F'_4$, to produce also a beat frequency $F'_1$. The resultant frequencies ($F'_1$) from mixers 6, 8 and 10, and frequency $F'_1$ taken directly from the converter 4, are coupled to the input of a bandpass filter 11 over equalizing networks 12, 13, 14 and 15.

As stated above the frequencies $F'_1$, $F'_2$, $F'_3$ and $F'_4$ are converted to a common frequency, or as in the preferred arrangement $F'_2$, $F'_3$ and $F'_4$ are converted to a resultant frequency of $F'_1$; $F'_1$ being the frequency of common level. If there is no frequency-drift in the high-frequency oscillator 3 or at the transmitter end, then the common level becomes a predetermined frequency, and the output from the discriminator 16 is zero. Any drift in the high-frequency oscillator, or at the transmitter, produces excursion from the predetermined frequency. However, the excursions are generally only small variations from the predetermined frequency, and the converted signals may be considered as occupying a common level.

In Twinplex, the four frequencies $F'_1$, $F'_2$, $F'_3$ and $F'_4$ are 1950, 2350, 2750 and 3150 C. P. S. respectively. The reference oscillator 5 generates oscillations of 400 C. P. S. and the harmonic generators 7 and 8 doubles and triples the frequency of oscillations and produces frequencies of 800 C. P. S. and 1200 C. P. S. respectively. Thus, the heterodyned frequencies appearing at the outputs of mixers 6, 9 and 10 are also 1950 C. P. S.

The output of the 1950 cycle band-pass filter is coupled to a frequency discriminator of a type well known in the art, and the direct current thereof, being representative of any constant frequency drift present in the H. F. oscillator 3, is applied to an integrating network 17, so that successive resultant rectified currents are averaged. Thus, a minor drift of $F'_1$ in one direction may be compensated by a minor drift of $F'_2$ in the opposite direction producing an output of zero. A constant drift, of course, would result in an average error voltage which is applied to a reactance tube 18 which controls the oscillator 3.

It is to be appreciated that the reference oscillator 5 does not introduce any significant error or distortion into the AFC circuit because its frequency is extremely low as compared with the high-frequency oscillator 3. For example, if we were to assume a 1% error in both oscillators 3 and 5, and that oscillator 3 generates a wave having a frequency of 20 megacycles and oscillator 5 generates a wave having a frequency of 400 C. P. S. then the drift in the high-frequency oscillator would be 200,000 C. P. S. whereas the drift in the oscillator 5 would be 4 C. P. S.

Although the invention has been described in connection with an AFC circuit adapted to produce completely continuous control, it has been learned in practice that satisfactory control is possible using only frequencies $F_1$, $F_2$ and $F_3$.

While I have described above the principles of my invention in connection with specific apparatus, it is to be clearly understood that this description is made only by way of example and not as a limitation to the scope of my invention as set forth in the objects thereof and in the accompanying claim.

I claim:

In an apparatus for receiving any of four different carrier frequency signals transmitted at different time intervals in a two-channel frequency shift radio telegraph system, a first local oscillator, means for deriving four intermediate frequency waves from said respective carrier frequency signals combined with waves from said first local oscillator, a second local oscillator of a frequency lower than the frequency of said first local oscillator, means for deriving two harmonic frequencies from said second local oscillator, means for mixing waves of the frequency of said second local oscillator and waves of said two harmonic frequencies respectively with three of said intermediate frequency waves whereby common beat frequency waves are derived, the frequency of which is equal to the frequency of the fourth of said intermediate frequency waves, means for deriving an average control voltage from the successive beat frequency waves and said waves of said fourth intermediate frequency, and means for applying said control voltage to said first local oscillator to stabilize the frequency thereof.

References Cited in the file of this patent

UNITED STATES PATENTS

| | | |
|---|---|---|
| 2,341,649 | Peterson | Feb. 15, 1944 |
| 2,354,827 | Peterson | Aug. 1, 1944 |
| 2,530,614 | Hugenholtz | Nov. 21, 1950 |